United States Patent [19]

Lu et al.

[11] Patent Number: 5,159,660
[45] Date of Patent: Oct. 27, 1992

[54] UNIVERSAL PROCESS CONTROL USING ARTIFICIAL NEURAL NETWORKS

[75] Inventors: Yong-Zai Lu; George S. Cheng; Michael Manoff, all of Sacramento, Calif.

[73] Assignee: Western Thunder, Sacramento, Calif.

[21] Appl. No.: 596,056

[22] Filed: Oct. 11, 1990

Related U.S. Application Data

[63] Continuation-in-part of Ser. No. 565,358, Aug. 9, 1990.

[51] Int. Cl.$^5$ ............................................. G06F 15/46
[52] U.S. Cl. ...................................... 395/22; 395/906; 364/148; 364/165
[58] Field of Search .................. 364/513, 148–166, 364/178; 395/22

[56] References Cited

U.S. PATENT DOCUMENTS

| | | | |
|---|---|---|---|
| 4,054,780 | 10/1977 | Bartley et al. | 364/106 |
| 4,133,011 | 1/1987 | Kurzwell, Jr. | 360/78 |
| 4,195,337 | 3/1980 | Bertrand et al. | 364/106 |
| 4,197,576 | 4/1980 | Sanchez | 364/106 |
| 4,639,853 | 1/1987 | Rake et al. | 364/149 |
| 4,698,745 | 10/1987 | Hiroi et al. | 364/165 |
| 4,730,259 | 3/1988 | Gallant | 364/513 |
| 4,852,053 | 7/1989 | Turrie | 364/151 |
| 4,882,526 | 11/1989 | Iino et al. | 318/561 |
| 5,016,188 | 5/1991 | Lan | 364/513 |

OTHER PUBLICATIONS

Psaltis et al., "A Multilayered Neural Network Controller", IEEE Control Systems Mag., Apr. 1988, pp. 17–21.
Miller et al., "Real-Time Dynamic Control of an Industrial Manipulator Using a Neural-Network-Based Learning Controller", IEEE Trans. on Robotics and Automation, vol. 6(1), Feb. 1990, pp. 1–9.
Hale, F. J., Introduction to Control System Analysis and Design, Prentice-Hall Inc., 1973, pp. 1–23.
Narendra et al., "Identification and Control of Dynamical Systems Using Neural Networks", IEEE Trans. Neural Networks, vol. 1(1), Mar. 1990, pp. 4–27.
"Neural Network Models for the Learning Control of Dynamical Systems With Application to Robotics" by F. Pourboghrat & M. R. Sayeh, Southern Illinois University.
"A Neural Network Methodology for Process Fault Diagnosis" by V. Vankatasubramania King Chan, Laboratory for Intelligent Process Systems, School of Chem. Eng. Purdue.
"Neural Network Architectures for Robotic Applications" by Sun–Yuan Kung and Jeng–Neng Hwang, members IEEE.

*Primary Examiner*—Michael R. Fleming
*Assistant Examiner*—Robert W. Downs

[57] ABSTRACT

Adaptive control for a wide variety of complex processes is provided by an ANN controller with input and hidden layers having a plurality of neurons, and an output layer with a single neuron. The inputs to the ANN are a time sequence of error values, and the neuron paths are weighted as a function of these error values and the present-time process output. The present-time error value may be added to the output layer of the ANN to provide faster response to sudden input changes. The controller of this invention can efficiently handle processes with nonlinear, time-varying, coupled and variable-structure behaviors as well as process parameter and/or structure uncertainties. Large steady-state gains in the process can be compensated by attenuating the ANN block output.

11 Claims, 16 Drawing Sheets

UNIVERSAL PROCESS CONTROL USING ARTIFICIAL NEURAL NETWORKS

STATEMENT OF RELATED CASES

This case is a continuation-in-part of application Ser. No. 07/565,358 filed Aug. 9, 1990, entitled "Universal Process Control Using Artificial Neural Networks."

FIELD OF THE INVENTION

This invention relates to industrial process controls, and more particularly to a method and apparatus for adaptively controlling complex systems.

BACKGROUND OF THE INVENTION

The increasing complexity of industrial processes in a variety of industries makes it more and more imperative for automatic controllers to make experience-based judgments akin to human thinking in order to cope with unknown or unanticipated events affecting the economics and safety of the process.

The popular Proportional-Integral-Derivative (PID) controller can provide satisfactory control behavior for many single-input single-output (SISO) systems whose dynamics change within a relatively small range. However, PID has major difficulties in controlling complex systems such as chemical reactors, blast furnaces, distillation columns, and rolling mills. These systems are usually time-varying and nonlinear, their inputs and outputs are seriously coupled, and the system dynamics have parameter and structure uncertainties.

Many advanced control techniques such as Model Predictive Control, Robust Control, and Adaptive Control have been developed to handle these systems. However, all of these techniques depend on a precise and relatively simple dynamic model for the process. It is usually difficult to find such a model, and model uncertainties can affect the control performance seriously even if the model is obtained. Due to the complexity of implementing these techniques, no generic controllers or software packages exist, which makes commercially practical control of complex industrial processes very difficult and expensive.

A more recent control method based on expert system technology, called expert control or intelligent control, represents a step in this direction. It takes the so-called what-to-control-and-what-algorithm-to-use approach to adjust the control strategy based on changes in the system environment and control tasks. However, expert controls are heavily dependent on the knowledge base built by expertise and real-time inference. In practice, it is hardly possible to establish a real-time knowledge base which duplicates the system dynamics for complex systems. For this reason, expert controls are useful mainly for optimization and decision making problems such as production planning, scheduling, and fault diagnosis.

Consequently, a need still exists for a generic controller which can be used easily and effectively to control a wide variety of complex systems. The controller should have powerful self-learning and adaptation capability to cope with uncertainties and changes in the system environment. Moreover, the controller should be based on closed-loop real-time input/output data and qualitative knowledge of the system behavior only. No precise knowledge of system dynamics should be required.

SUMMARY OF THE INVENTION

The present invention fulfills the above-stated objectives by providing a controller in which an artificial neural network (ANN) driven and weighted by a time sequence of error values directly controls the process.

More specifically, in a first aspect of the invention, the measured variable is compared at predetermined time intervals to the setpoint, and a series of error signals are generated. These error signals are used as the input to an ANN controller, and are also used, together with the process output, as the learning resources for adjusting the weighting factors which interconnect the neurons within the ANN. The output of the ANN controller is the input of the process.

In accordance with a second aspect of the invention, the present-time input of the ANN block is added to the present-time output of the ANN output layer so as to let the ANN controller respond to an error signal immediately.

In accordance with a third aspect of the invention, the ANN block output is selectably attenuated to compensate for a large steady-state gain of the process.

DESCRIPTION OF THE PREFERRED EMBODIMENT

Figure 1A:
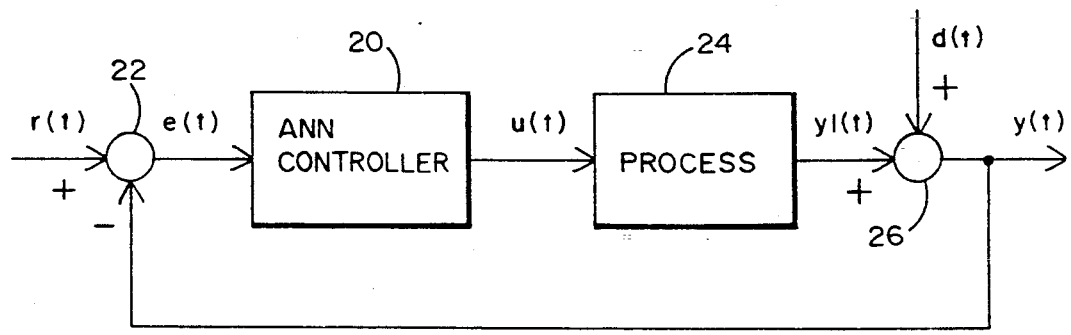
FIG. 1a is a block diagram of a single-loop feedback control system using the ANN controller of this invention.

FIG. 1a illustrates a typical single-loop feedback control system with an ANN controller. The error signal e(t) whose times samples from sampler 27 constitute the input to ANN controller 20, is provided by comparing the setpoint signal r(t) produced by the setpoint generator 21 (e.g. a control knob); with y(t) in comparator 22. The output u(t) of controller 20 is the input signal to the process 24, whose output is the value y1(t). The measured variable signal y(t) is representative of the sum of y1(t) and the disturbance d(t). The combination of y1(t) and d(t) is symbolically represented by an adder 26.

The signals shown in FIG. 1a are as follows:

r(t)—Setpoint (SP), the setpoint signal which represents the the target value or trajectory of the process output.

y(t)—Measured Variable (MV), the process output signal which represents the measured process output.

u(t)—Output (OP), the control signal which is the controller output and the process input.

e(t)—Error (ER), the error signal e(t)=r(t)−y(t).

d(t)—Disturbance, the disturbance caused by noise or load changes.

y1(t)—Process Output, the actual output of the process itself in the absence of disturbances, where y(t)=y1(t)+d(t).

The control objective is to make the measured variable y(t) track the given trajectory of its setpoint r(t) under variations of setpoint, disturbance, and system dynamics.

In other words, the task of the ANN controller is to minimize the error between setpoint and measured variable as represented in Equation (1):

$$\text{MIN } e(t)^2 = \Sigma(r(t)-y(t))^2 \tag{1}$$

Figure 1B:
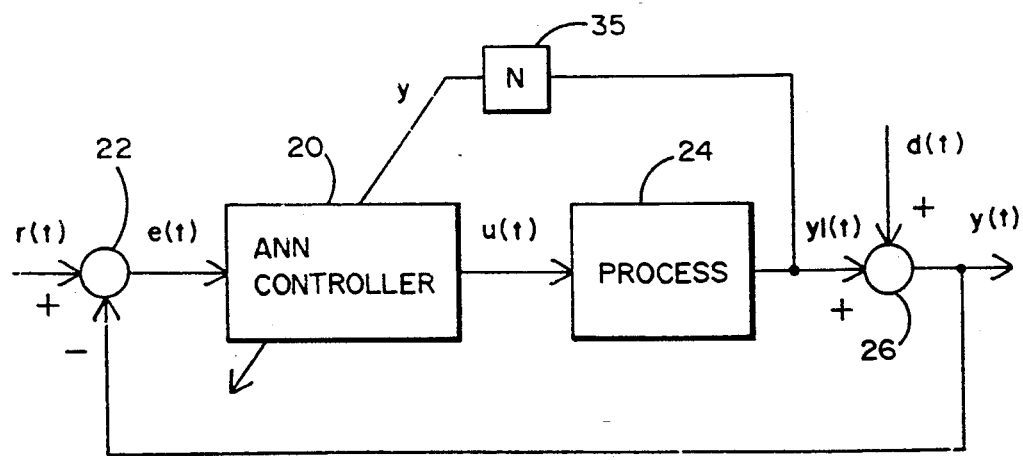
FIG. 1b is a block diagram similar to FIG. 1a but showing additional parameters involved in the learning algorithm of this invention.
Figure 3:
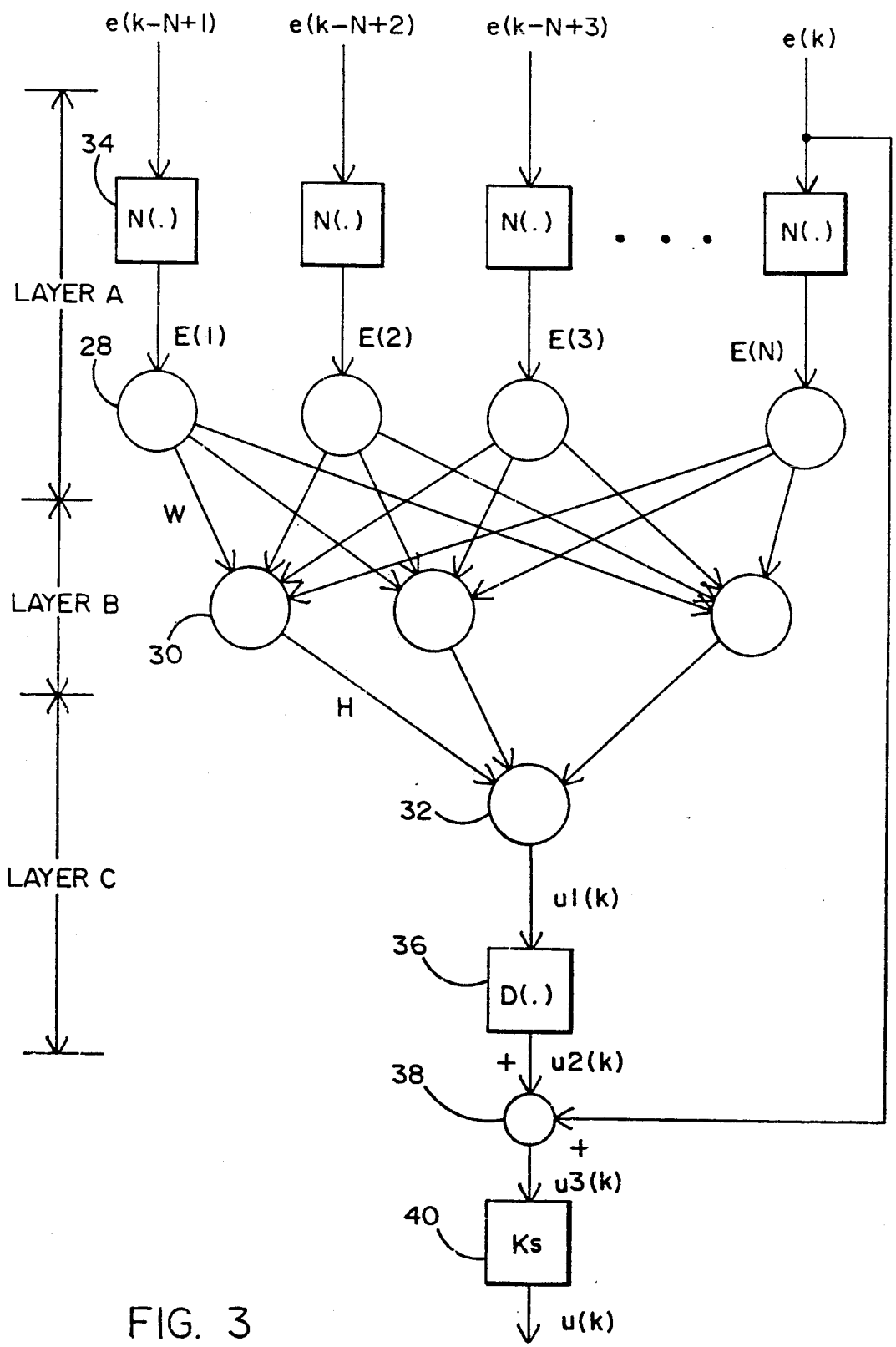
FIG. 3 is a structural diagram of the ANN controller of this invention.
Figure 4:
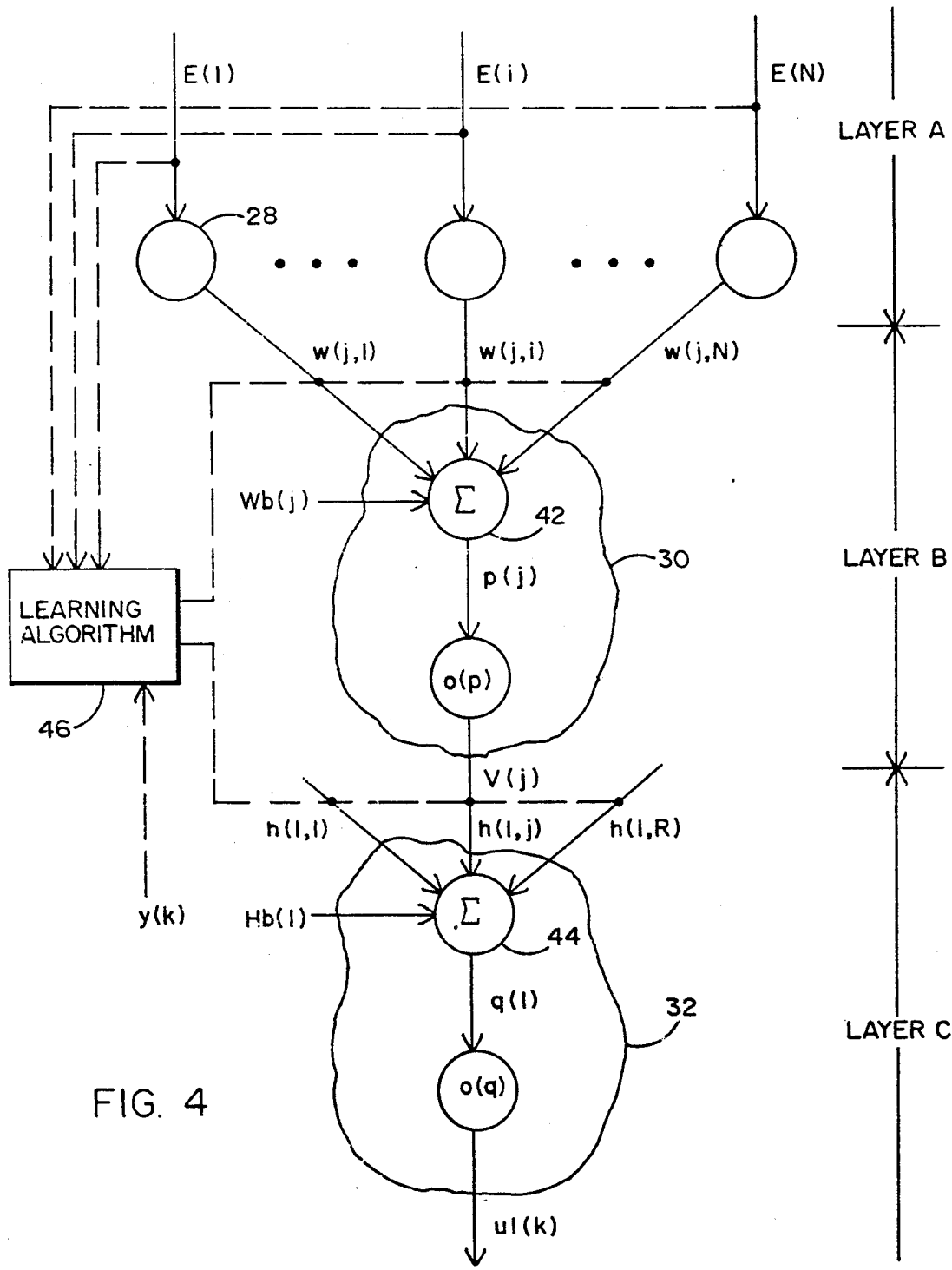
FIG. 4 is a detailed diagram of a portion of the ANN controller of FIG. 1b.

FIG. 1b illustrates the additional input signal Y(k) to the learning algorithm of the ANN controller 20 when the ANN controller structure of FIGS. 3 and 4 is used. In FIG. 1b, Y(k) is the process output y1(t) in the current iteration normalized by the normalizing circuits 35. The normalizing factor N(. . ) of normalizer 35 is, of course, the appropriate arithmetic expression which translates a y1(t) signal variable between a known lower limit (LL) and a known upper limit (UL) into a Y(k) signal variable between 0 and 1.

Figure 2:
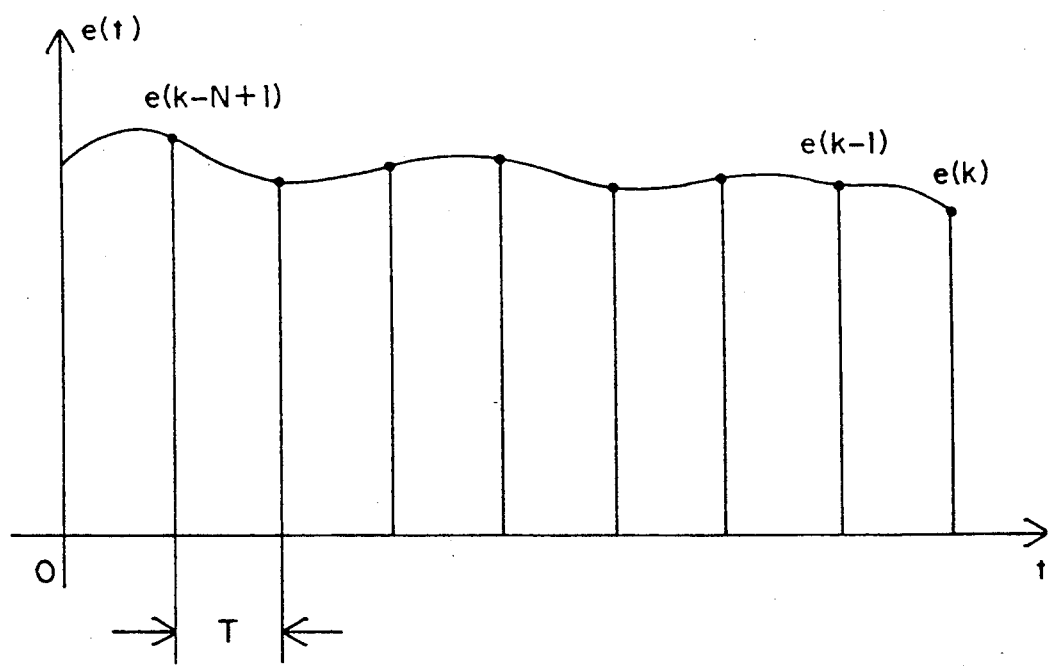
FIG. 2 is a time-amplitude diagram illustrating the sampling of the error signal.

FIG. 2 illustrates the variation of the error signal e(t) with time. In the system of this invention, e(t) is iteratively sampled by a conventional memory-equipped sampling circuit 27 (FIG. 6) at sampling intervals T which are determined by the nature of the process to be controlled. The values of e(t) stored in the sampling circuit 27 and used herein are e(k−N+1) through e(k), where k is the current iteration.

FIG. 3 is a structural diagram of the ANN controller embodied in this program. The ANN has one input layer (layer A) with N neurons 28, one hidden layer (layer B) with R neurons 30, and one output layer (layer C) with one neuron 32. The selection of N and R is based on the nature of the process.

The input to layer A consists of stored error signal samples e(k−N+1) through e(k). These samples are normalized to a value range of 0 to 1 by processing them through an appropriate normalization factor N(.), in the normalizing circuits 34, to become E(1) through E(N). Each neuron's output in layer A is conveyed separately to each of the neurons in layer B via a path weighted by an individual weighting factor w(j,1) through w(j,N), where j=1, R. The inputs to each neuron 30 are summed, and the output of each neuron 30 is conveyed to the single neuron 32 via a path weighted by an individual weighting factor h(1,1) through h(1,R).

Figure 18:
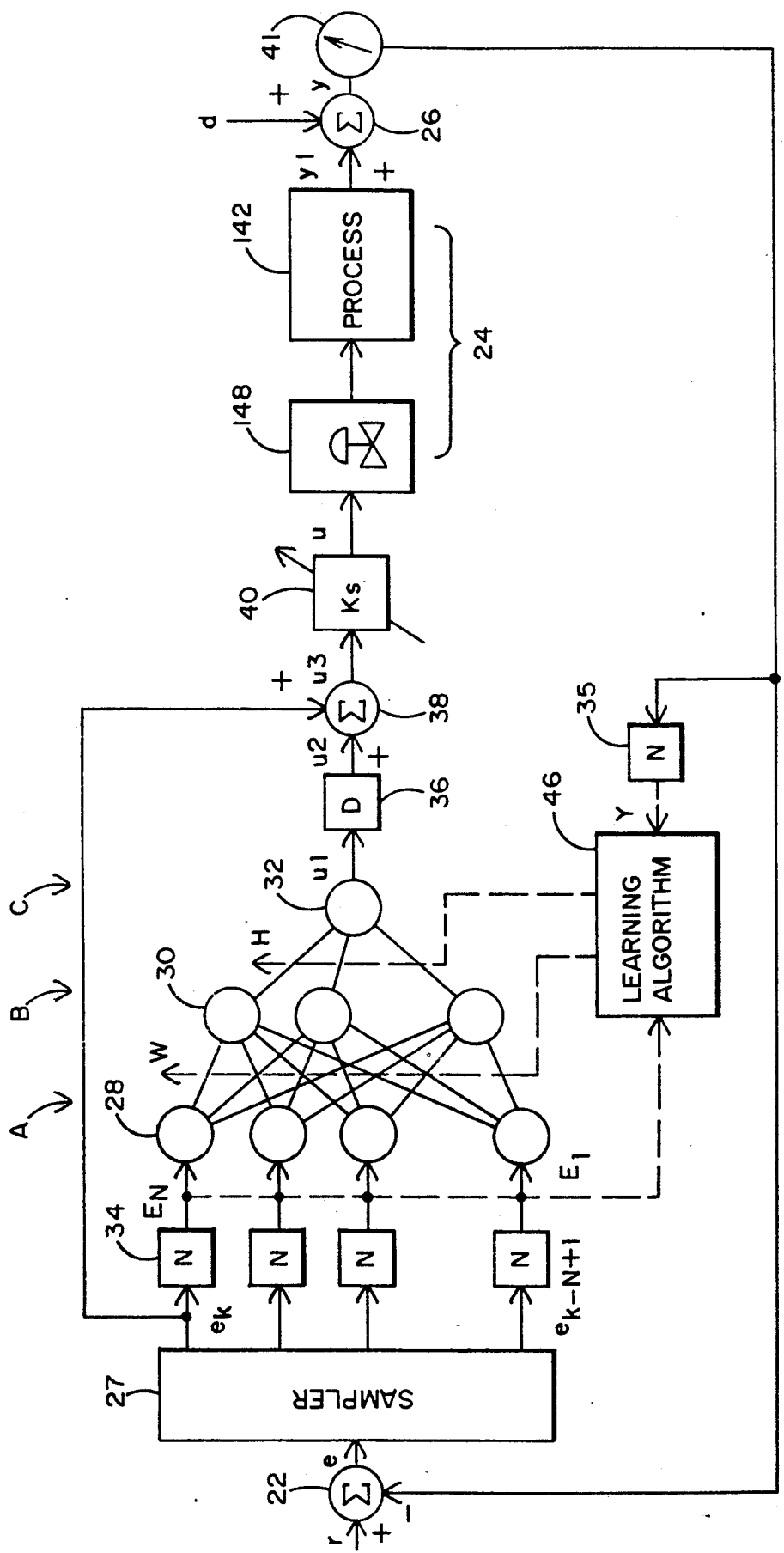
FIG. 18 is a schematic representation combining the elements of FIGS. 1b and 3, as well as part of FIG. 15.

The output u1(k) of neuron 32 is denormalized to the original value range of e(t) by denormalizing circuit 36 to form the output layer output u2(k). Next, u2(k) and e(k) are summed in the adder 38 to produce the ANN block output u3(k). Finally, u3(k) is attenuated through a steady-state gain compensator 40 to produce the ANN controller output u(k), which in the time domain corresponds to u(t) of FIGS. 1a and 1b. The elements of FIGS. 1b and 3 have been combined for greater clarity in FIG. 18, in which corresponding reference numerals are used. In addition, valve 148 of FIG. 15 has been shown as being the recipient of the control signal u to illustrate the fact that valve 148 is the structural process element controlled by the ANN controller of FIG. 18. Furthermore, the y signal of the symbolically shown adder 26 has been shown in FIG. 18 as a meter 41 to symbolically show that y is a measured variable. Also, Ks has been shown to be adjustable.

FIG. 4 is a detailed diagram of a portion of the neuron network of layers A, B, and C. The inputs to adder 42 consist of one output from each neuron 28 plus a bias signal Wb(j) (typically Wb(j)=1). The summation signal p(j) is processed by a sigmoidal function σ(p) to form the output V(j) of neuron 30. Likewise, the inputs to adder 44 consist of one output from each neuron 30 plus a bias signal Hb(1) (also, typically, Hb(1)=1). The summation signal q(1) is processed by a sigmoidal function σ(q) to form the output u1(k) of neuron 32.

The sigmoidal function σ(p) is such that $$V(j) = \frac{1}{1 + e^{-p(j)}} \tag{2}$$

Likewise, the sigmoidal function σ(q) is such that $$u1(k) = \frac{1}{1 + e^{-q(1)}} \tag{3}$$

The paths from neurons 28 to adder 42 are weighted by weighting factors w(j,1) through w(j,N). Likewise, the paths from neurons 30 to neuron 32 are weighted by weighting factors h(1,1) through h(1,R). These weighting factors are adjusted for each iteration by a learning algorithm 46, whose inputs are the normalized error values E(1) through E(N), and the normalized process output value Y(k) at iteration k.

Initially, the weighting factors are set randomly. The subsequent adjustment is based on the learning algorithm 46 in the following manner:

On each iteration, the weights of layer C are first updated from the previous sample accordingly to the formula $$h(1,j)(k) = h(1,j)(k-1) + \Delta h(1,j) \tag{4}$$

where in each iteration, h(1,j)(k) is the present value of h(1,j), h(1,j)(k−1) is the last previous value of h(1,j), and $$\Delta h(1,j) = \eta Y(k)(1 - Y(k))V(j)Es \tag{5}$$

where Es is the sum of E(i), the i normalized error values E(1) through E(N), weighted by a scaling factor a(i) such that $$Es = \sum_{i=1}^{N} a(i) E(i) \qquad (6)$$

The weights a(i) can be chosen such that $a(i) = \frac{1}{2}^i$.

Then, the weights of layer B are updated from the previous sample according to the formula $$w(j,i)(k) = w(j,i)(k-1) + \Delta w(j,i) \qquad (7)$$

where, using a like notation, $$\Delta w(j,i) = \eta V(j)(1 - V(j)) E(i) Y(k)(1 - Y(k)) Es \\ h(1,j)(k) \qquad (8)$$

in which E(i) is the normalized input to the ith neuron 28, and where Es is calculated by Equation (6).

In the preferred embodiment of the invention, $\eta$ is called the learning rate and is selected on the basis of an estimation of the dynamics of the process to be controlled. In most practical instances, a value between about 1 and 3 (preferably 2) may initially be set for $\eta$. If the operation of the controller indicates that a different value should be used, adjustments can be made.

Too high a value of $\eta$ will cause too much oscillation in the closed loop system response; too low a value of $\eta$ will cause an offset or an intolerably slow response.

The results of using the invention are best illustrated by the following simulation charts. In the discussion of these charts, S is the Laplace transform operator, Gp(S) is the Laplace transfer function of the process, Y(S) is the Laplace transform of y(t) (the process output), and U(S) is the Laplace transform of u(t) (the process input). The relationship between Gp(S), and Y(S), and U(S) is $$G_p(S) = \frac{Y(S)}{U(S)} \qquad (9)$$

Figure 5:
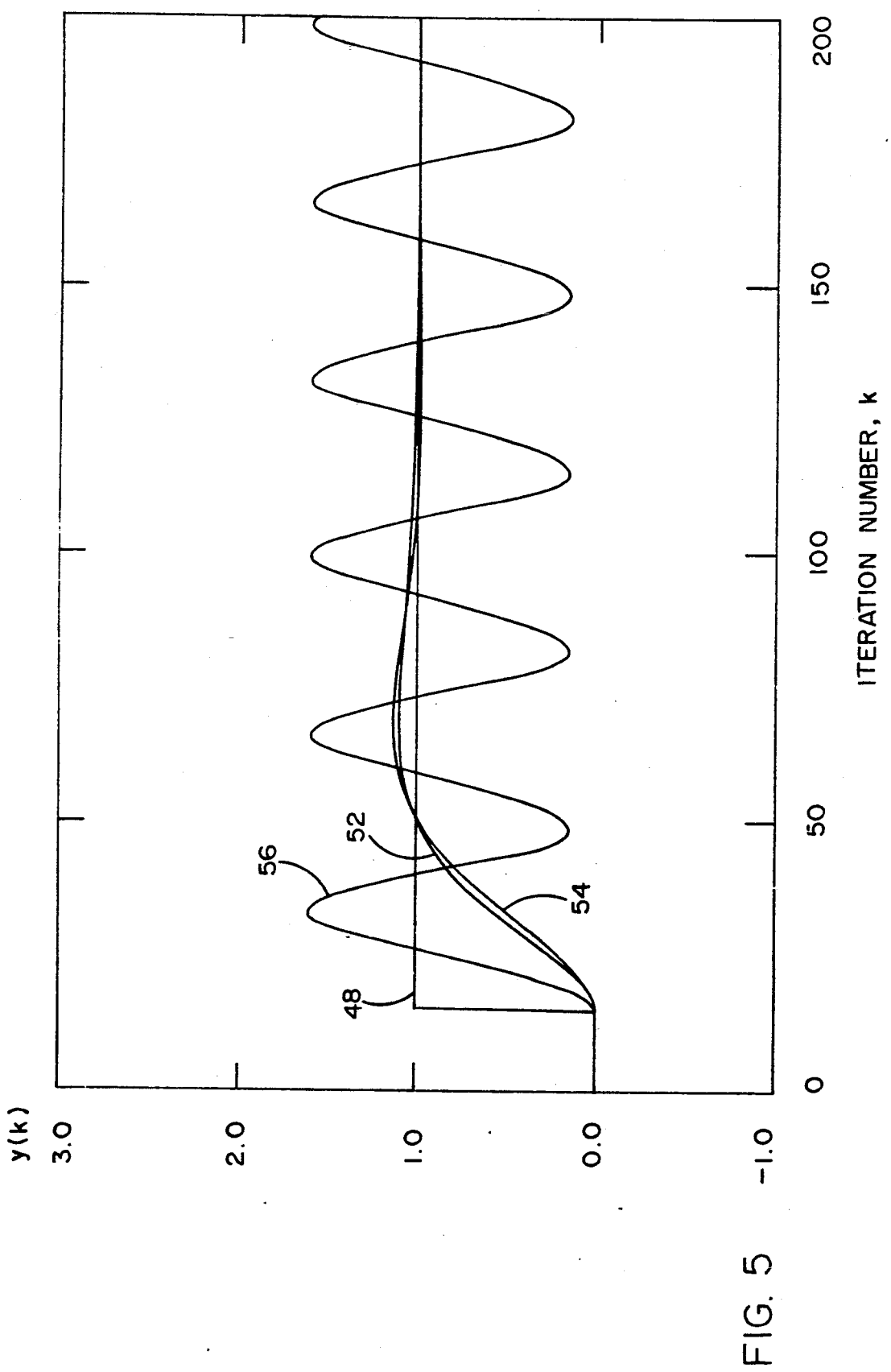
FIGS. 5 and 6 are time-amplitude diagrams showing comparative simulation results of ANN and PID control for processes with time constant and time delay changes, respectively.

FIG. 5 shows the simulation result of a comparison between ANN and PID control for a second order system with time-constant changes.

$$G_p(S) = \frac{1}{(S+1)(0.5S+1)} \rightarrow \frac{1}{(100S+1)(50S+1)} \qquad (10)$$

In FIG. 5, curve 48 shows the step input to the system (setpoint r(t) changes from 0 to 1). Curve 52 shows the system closed-loop step response under ANN control when the dominant time constant is 1, and also the response under the identical ANN control when the dominant time constant is 100. Curve 54 shows the response of the PID controller when the dominant time constant is 1, and curve 56 shows the response of the PID when the dominant time constant is 100. The sampling interval T is a function of the time constant (preferably about 1/20th of the dominant time constant in seconds) but no other parameters of either controller have been changed. It will be seen that even if the dominant time constant has changed as much as 100 times, the response under ANN control does not change. On the other hand, the dominant time constant change makes PID control unstable.

Figure 6:
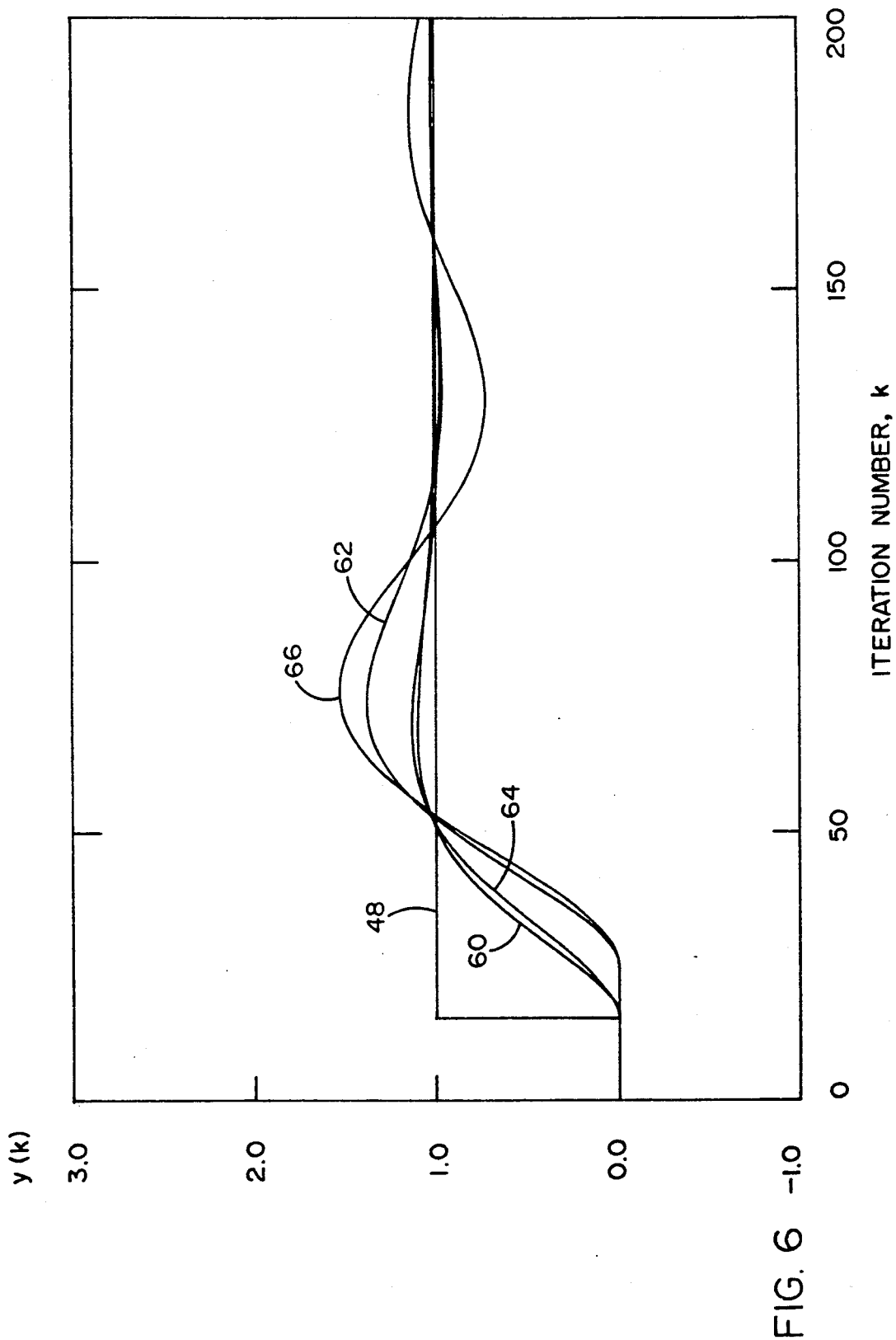

FIG. 6 shows the simulation result of a comparison between ANN and PID control for a second order plus delay process with time-delay changes:

$$G_p(S) = \frac{1}{(S+1)(0.5S+1)} \rightarrow \frac{e^{-s}}{(S+1)(0.5S+1)} \qquad (11)$$

In FIG. 6, curve 48 again shows the step input to the system. Curve 60 shows the response under ANN control when there is no delay. Curve 62 shows the system response under ANN control when the delay is 1. Curve 64 shows the response under PID control in the absence of delay, and curve 66 shows the response under PID when the delay is 1. No parameters of either controller have been changed in this instance. It will be seen that the ANN controller has a much better control performance than the PID in the presence of time delay changes.

Figure 7:
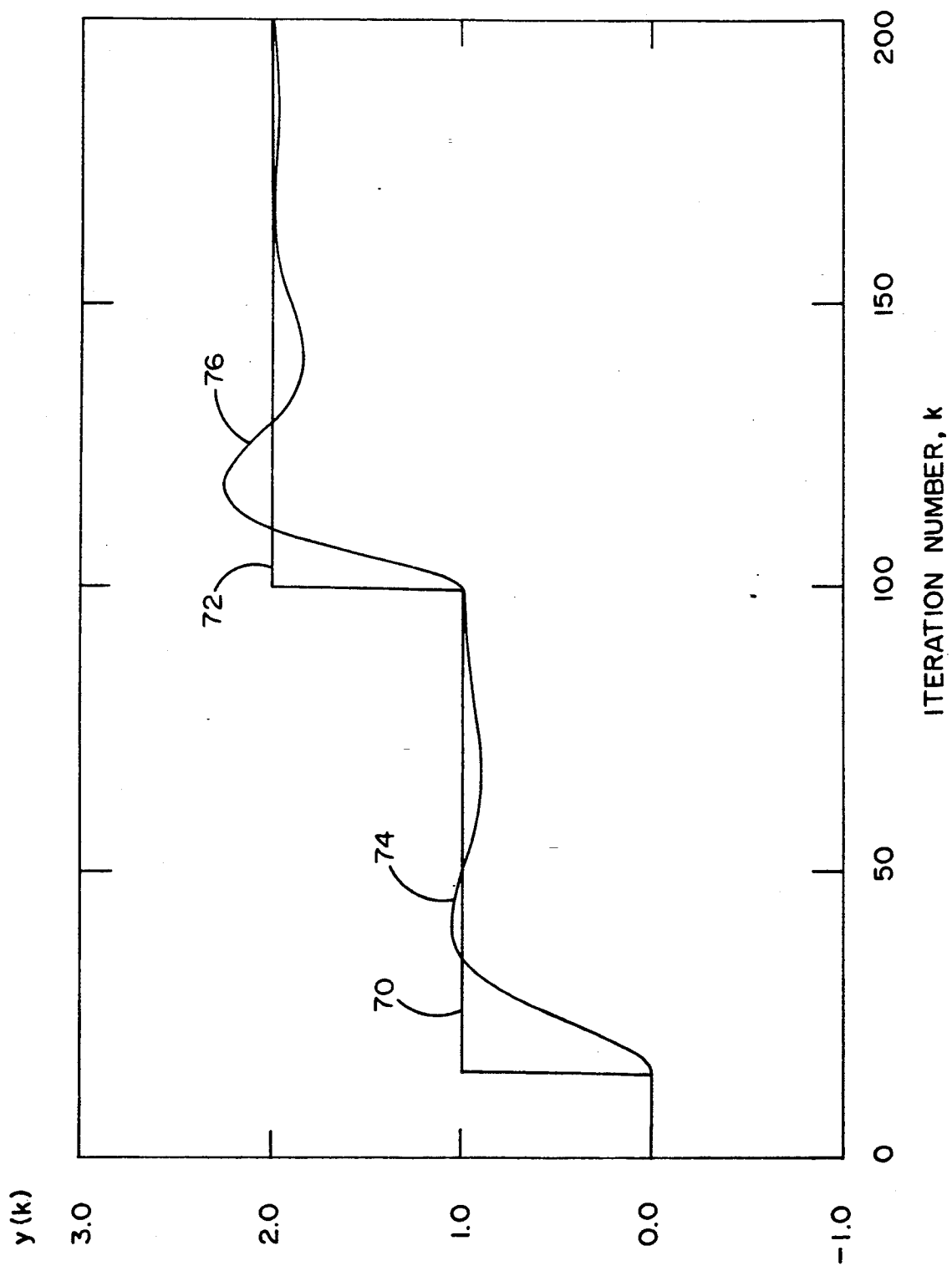
FIGS. 7 through 9 are time-amplitude diagrams showing the simulation results of ANN control with processes that are nonlinear in gain, time-variant, and noisy, respectively.

FIG. 7 shows the simulation result of ANN control for a nonlinear process, in which the DC gain varies as a function of r(t):

$$G_p(S) = \frac{K(r)}{(100S+1)(50S+1)} , K(r) = r^2 \qquad (12)$$

In FIG. 7, curves 70 and 72 show the system inputs. Curves 74 and 76 show the closed-loop step responses of the ANN control when r(t) changes from 0 to 1 (curve 74), and 1 to 2 (curve 76), respectively. In this connection, it should be noted that the gain change caused by the change in r(t) affects the response speed of the system: in FIG. 7, curve 74 reaches steady-state in eighty-five iterations, while curve 76 reaches it in sixty iterations. It is seen that the ANN works well for the process with a nonlinear gain.

Figure 8:
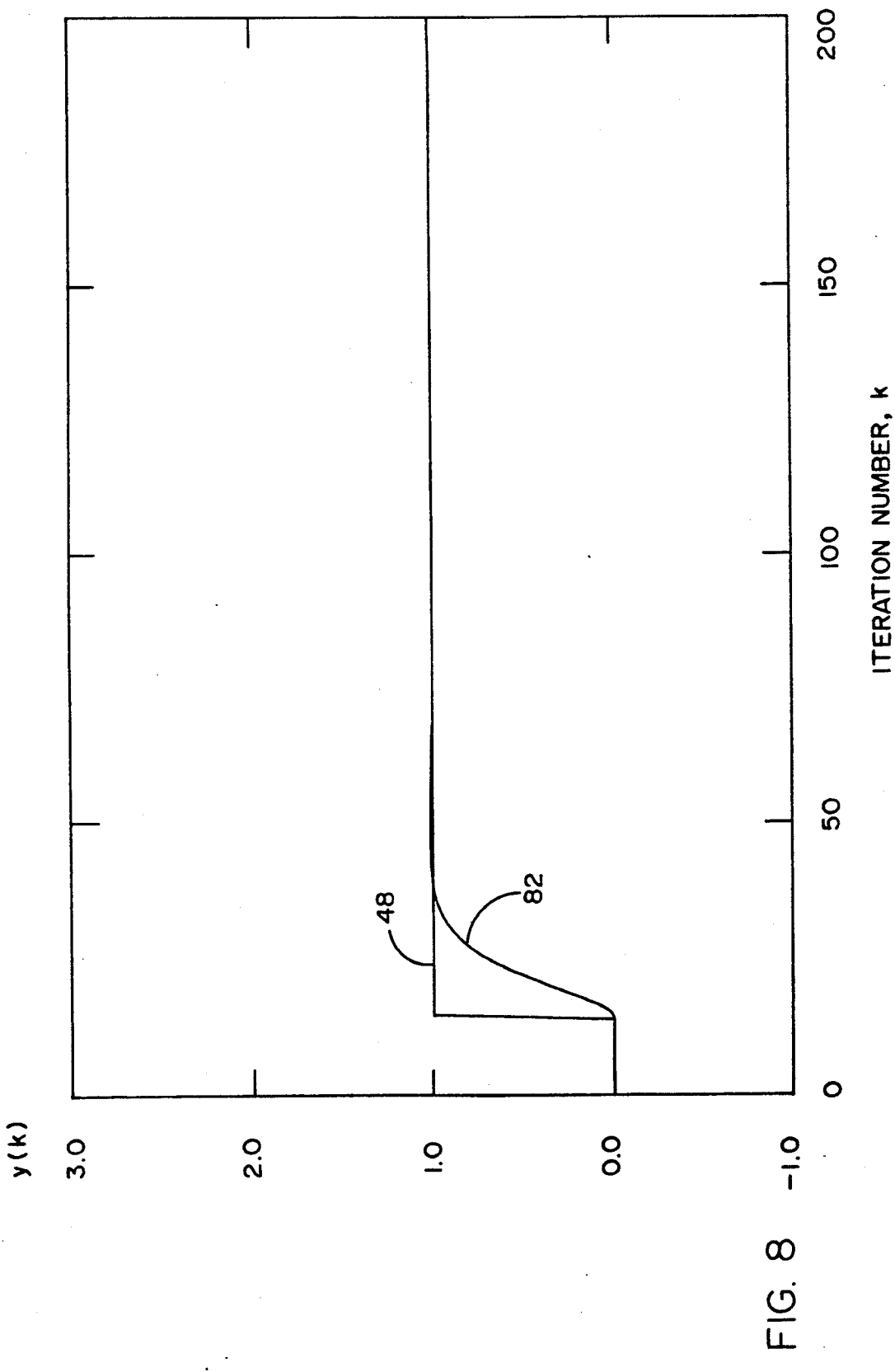

FIG. 8 shows the simulation result of ANN control for a time-varying process, in which the dominant time constant varies as a function of time:

$$G_p(S) = \frac{1}{(T1(t)S+1)(T2(t)S+1)} \qquad (13)$$

where $t1(t) = 0.25t + 10$, $t1(t) = 0.05t + 5$.

In FIG. 8, curve 48 shows the step input and curve 82 shows the system response under ANN control when T1(t) changes from 10 to 30, and T2(t) changes from 5 to 10. The sampling interval T is selected based on a nominal dominant time constant of 20 and is not changed. It will be seen that ANN control works sell for controlling time-varying processes.

Figure 9:
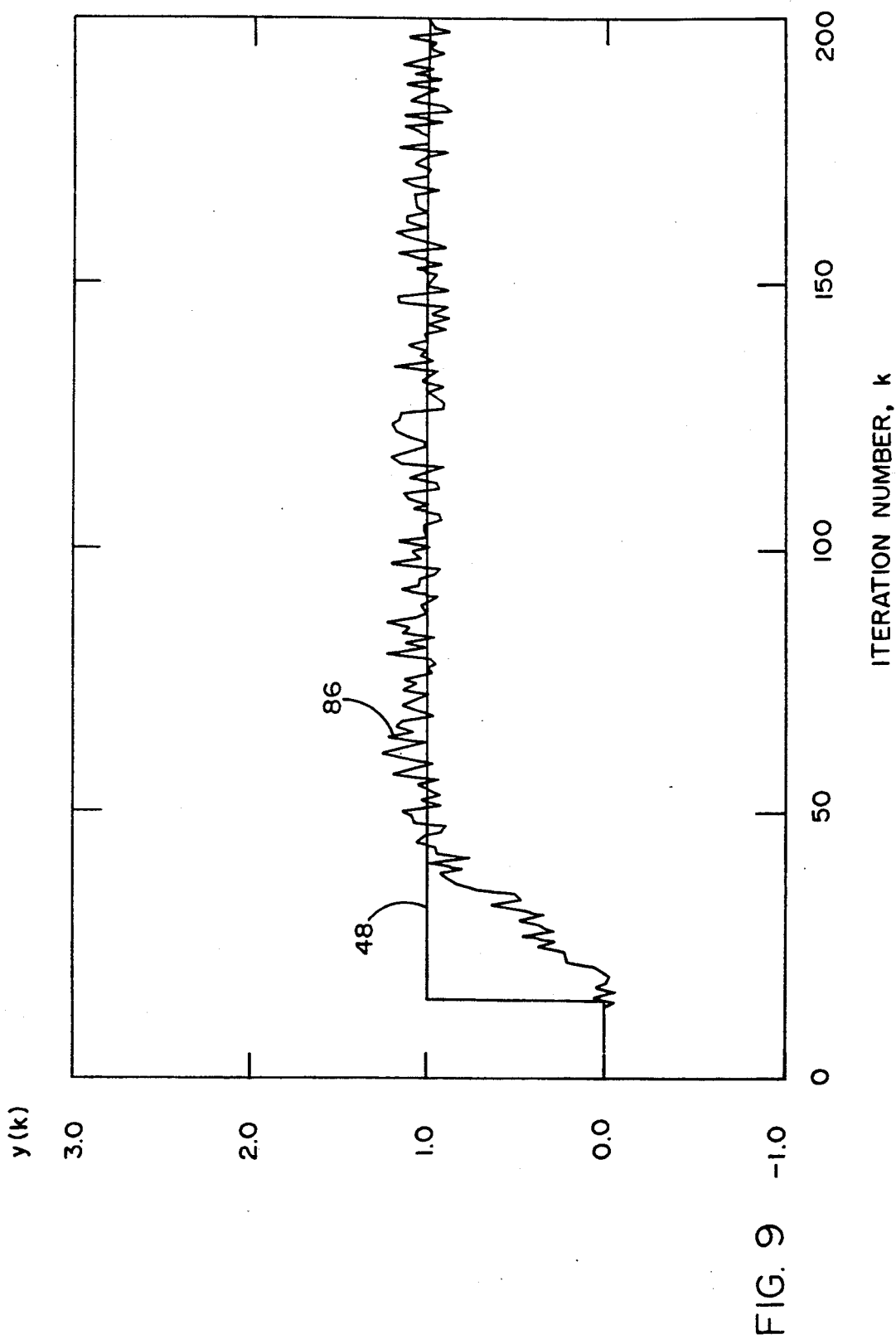

FIG. 9 is the simulation result of ANN control for a system with measurement noise $$G_p(S) = \frac{1}{(S+1)(0.5S+1)} , y(t) = y1(t) + d(t) \qquad (14)$$

where y1(t) is the process output, d(t) is white noise with zero mean value, and y(t) is the measured variable.

In FIG. 9, curve 48 is the step input and curve 86 is the system's step response under ANN control. It will be seen that the ANN controller works normally when random measurement noise is applied.

In FIGS. 10 to 14, the following processes are used:

$$G_p(S) = \frac{2}{(S+1)} \qquad (15)$$

$$G_p(S) = \frac{1}{(S+1)^3} \qquad (16)$$

$$G_p(S) = \frac{2}{(S + 1 + 0.5j)(S + 1 - 0.5j)} \quad (17)$$

$$G_p(S) = \frac{e^{-S}}{(S + 1)(0.5S + 1)} \quad (18)$$

$$G_p(S) = \frac{1}{(S + 1)^2 (2S + 1)(0.5S + 1)} \quad (19)$$

Figure 10:
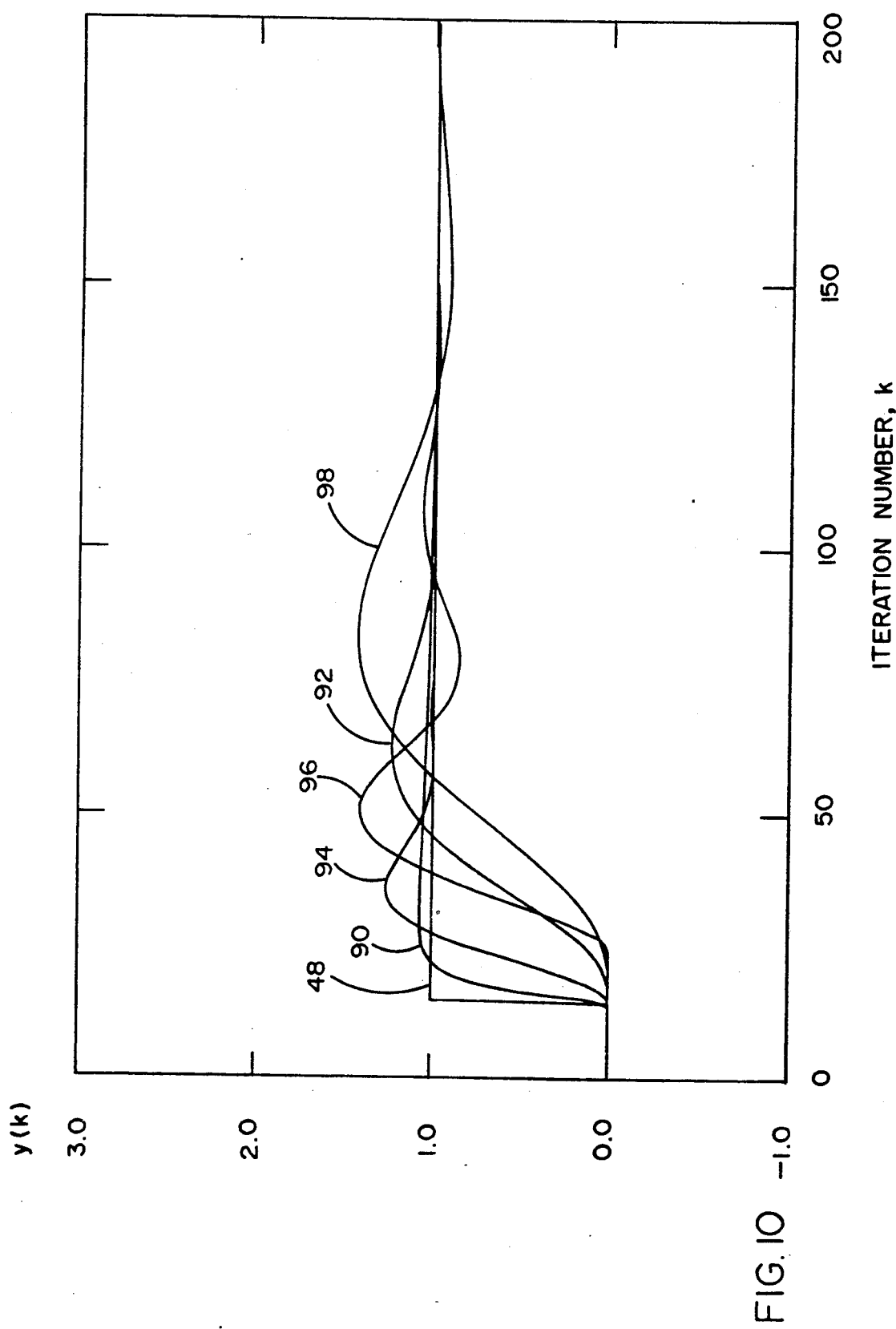
FIGS. 10 and 11 are time-amplitude diagrams showing comparative simulation results of ANN and PID control for five common processes.

FIG. 10 shows the simulation result of ANN control for the processes represented by Equations (15) through (19). In FIG. 10, curves 90 through 98 show the responses of ANN control for these five processes, respectively. In these cases, sampling interval=0.1, learning rate=2, and steady-state gain compensation=1.

Figure 11:
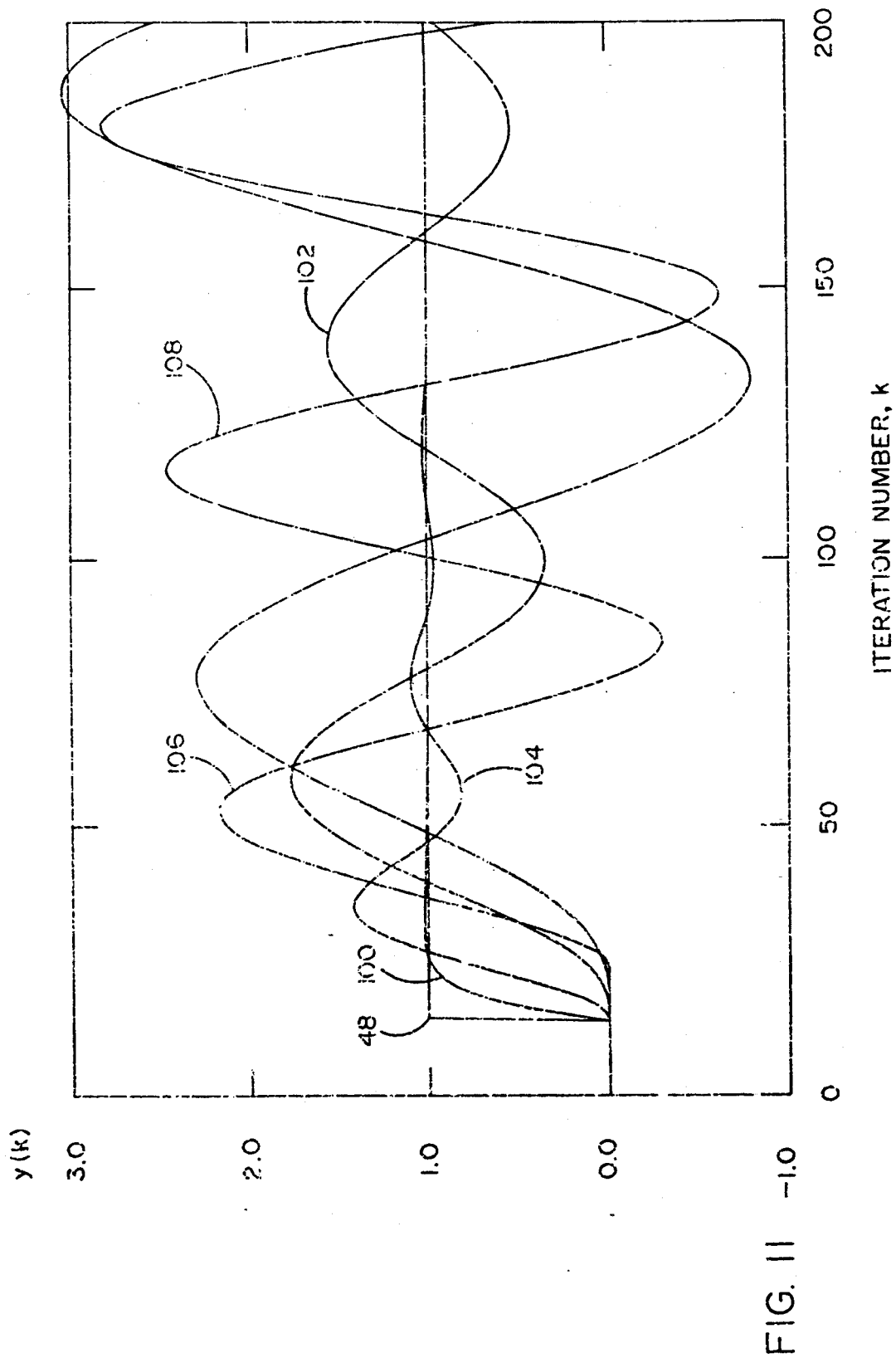

In FIG. 11, curves 100 through 108 show the responses of PID control for the processes (15) through (19), respectively. In these cases, sampling interval=0.1 seconds, Kp (proportional gain)=1, Ki (integral gain)=0.8, and Kd (differential gain)=0.01.

Comparing the simulation results of FIG. 10 and FIG. 11, it is seen that the ANN has excellent control performance for different types of processes, and that PID does not work if its parameters are not tuned properly each time.

Figure 12:
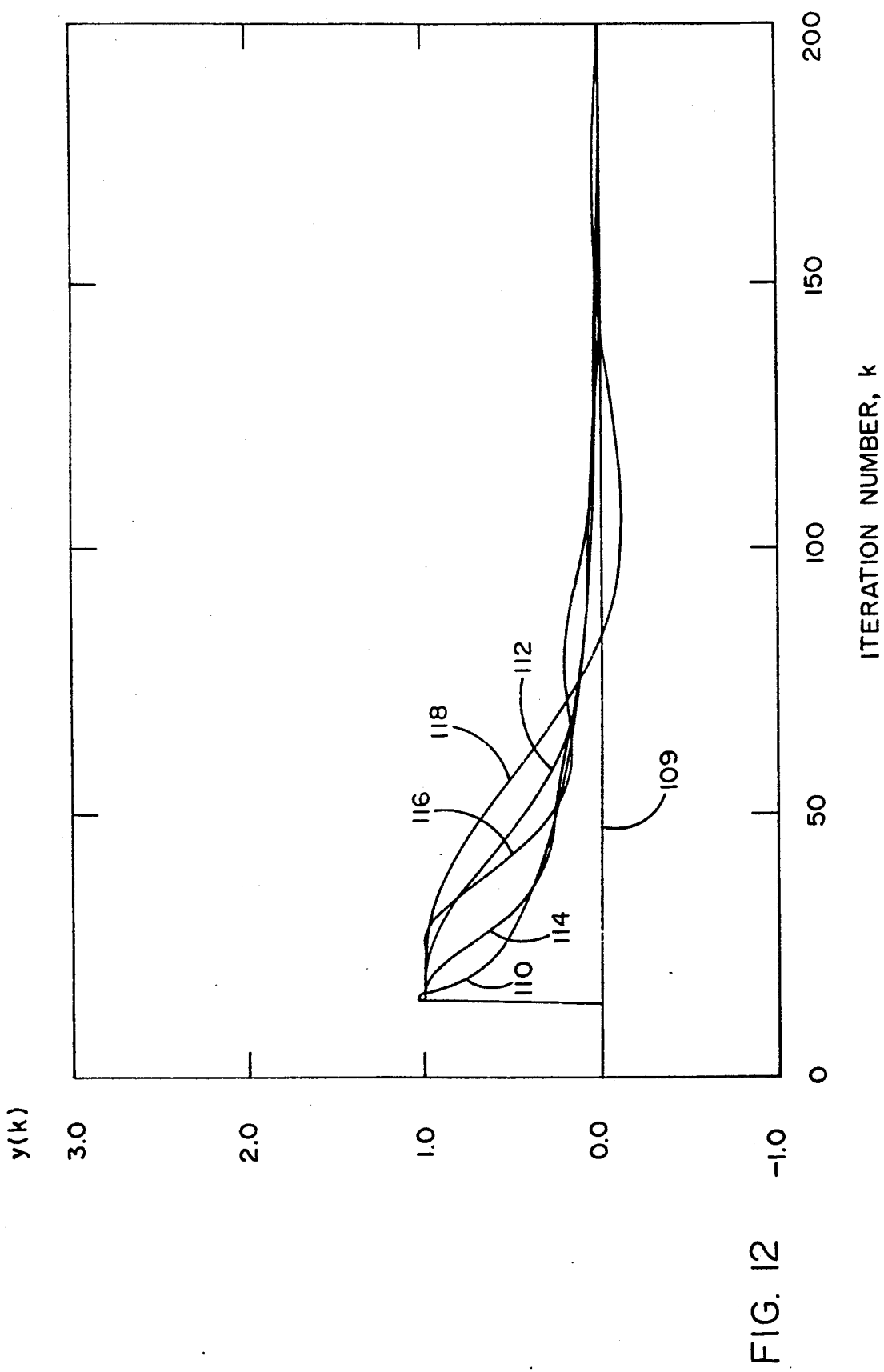
FIG. 12 is a time-amplitude diagram showing comparative simulation results of ANN control for the same five common processes with a disturbance change.

FIG. 12 shows the simulation result of ANN control for the processes (15) to (19) with a disturbance change. In this case, r(t) remains 0, and d(t) changes from 0 to 1. In FIG. 12, curve 109 shows the setpoint r(t), and curves 110 through 118 show the responses of ANN control to that change for these five processes, respectively. In these cases, all the tuning parameters remain the same as used in FIG. 10. It is seen that the ANN works for both tracking (setpoint change) and regulating (disturbance change) problems.

Figure 13:
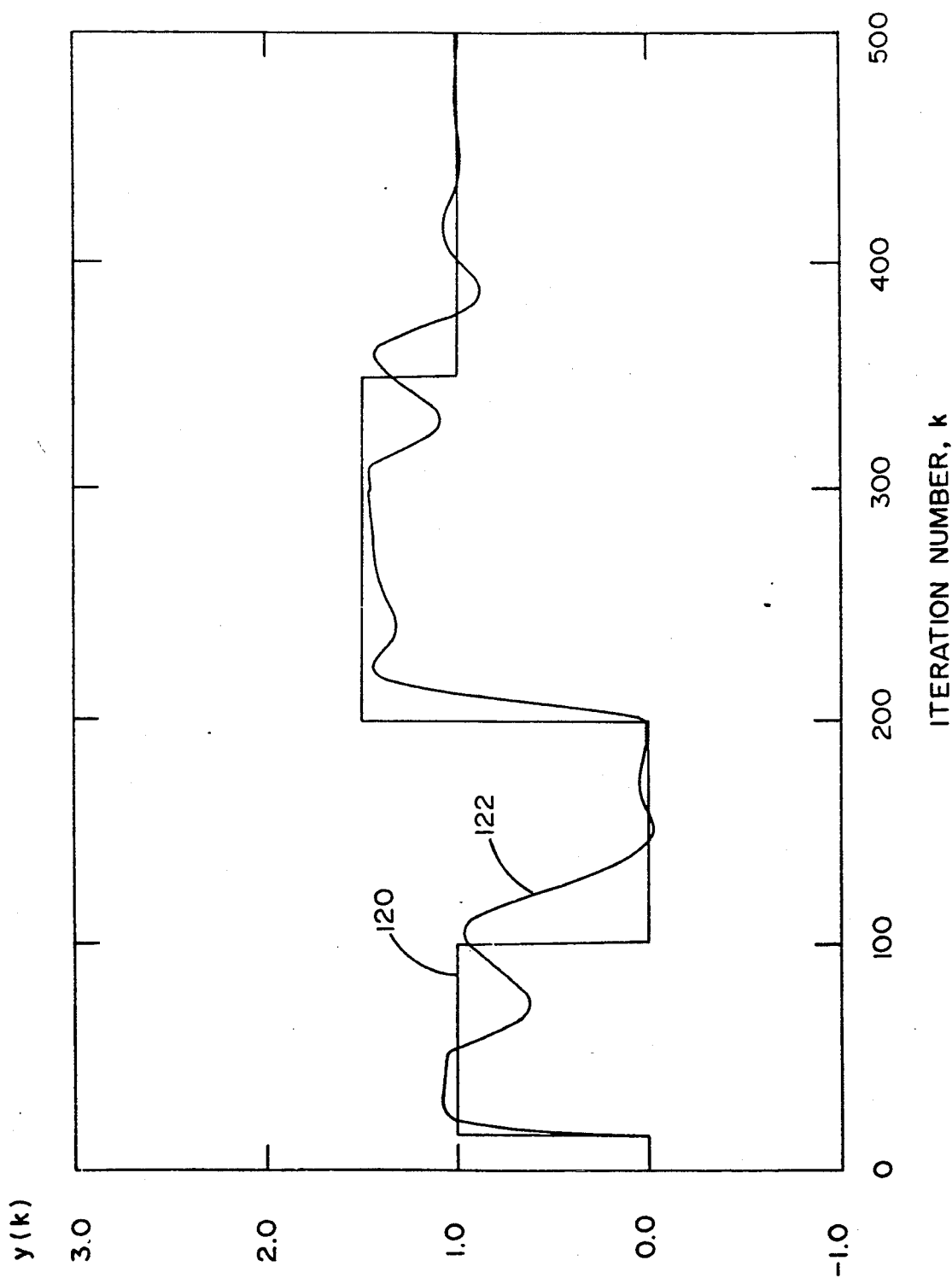
FIGS. 13 and 14 are time-amplitude diagrams showing the comparative results of ANN and PID control for a process with structure changes.

FIG. 13 shows the simulation result of ANN control for a process with varying structure. In this case, processes (15) through (18) are used. In FIG. 13, curve 120 is the setpoint that changes from 0 to 1, 1 to 0, 0 to 1.5, and 1.5 to 1. The process structure changes in the following manner:

| Iteration No. | Process |
|---|---|
| 0-50 | (15) |
| 51-150 | (16) |
| 151-300 | (17) |
| 301-500 | (18) |

Curve 122 shows the response of ANN control for the process with varying structure. In this simulation, all the tuning parameters remain the same as used in FIG. 10. It is seen that the ANN controller can adapt to the process structure changes well.

Figure 14:
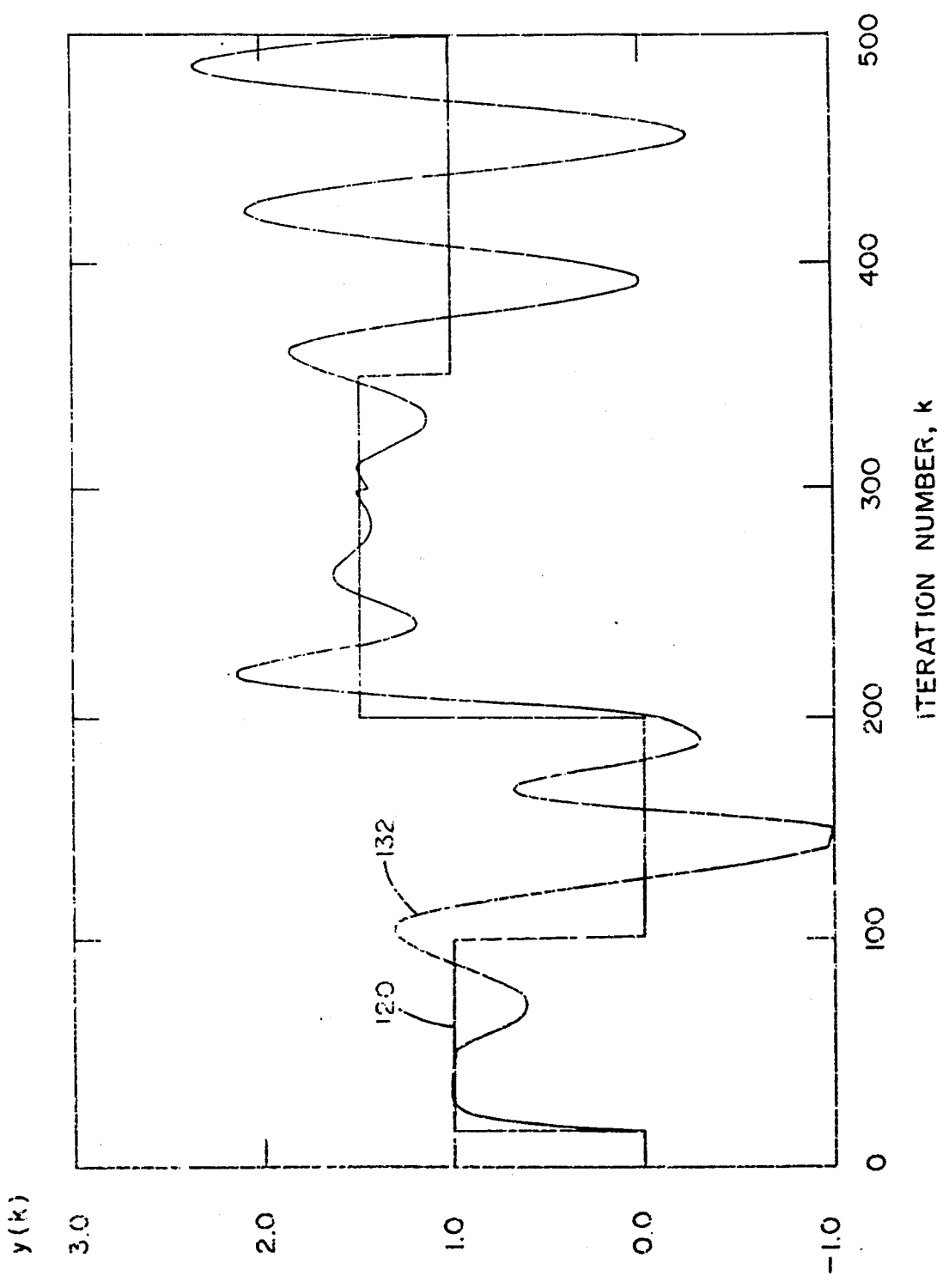

FIG. 14 shows the simulation result of PID control for the same experiment as shown in FIG. 13. The PID parameters are the same as used in FIG. 11. Curve 120 is the setpoint again, and curve 132 is the response of PID control for the process with varying structure. It is seen that PID does not perform well if its parameters are not tuned properly each time when the process structure changes.

To summarize, it will be seen that the ANN controller is not sigificantly affected by reasonable linear or non-linear changes in time constant, time delay, DC gain, disturbance, noise, and structure.

The time constant can vary over a wide range provided a matching sampling interval is used. If the time constant varies within a reasonable range, for instance from 1 to 10, the sampling interval can be selected based on a nominal time constant which is usually in the middle of the uncertainty range. Then the ANN controller will work within the range with the sampling interval selected.

The time delay can vary over a wide range as long as the ratio of time delay to dominant time constant is less than 2. If it is greater than 2, a special algorithm such as Smith Predictor should be used.

The DC gain can vary in the range of 0.1 to 10 without using the steady-state gain compensator 40 in the ANN controller as shown in FIG. 3. If the gain is greater than 10 or smaller than 0.1, configuration information is required for setting the compensator 40.

Disturbance and noise have very little effect on the controller, nor do structural changes as long as the system remains open-loop stable.

For an open-loop unstable process, the ANN controller cannot be used directly. However, many solutions are available to stabilize an open-loop unstable process. For instance, one can apply a negative feedback loop with a pure gain to the process so that the closed-loop system becomes stable. Then the ANN controller can be applied to control the stabilized process.

It will be seen that the PID controller does not have the properties mentioned above. It is quite sensitive to process dynamic variations in terms of time constant, time delay, DC gain, and structure changes. In fact, in many cases, PID will make the system unstable unless its parameters are re-tuned properly.

Figure 15:
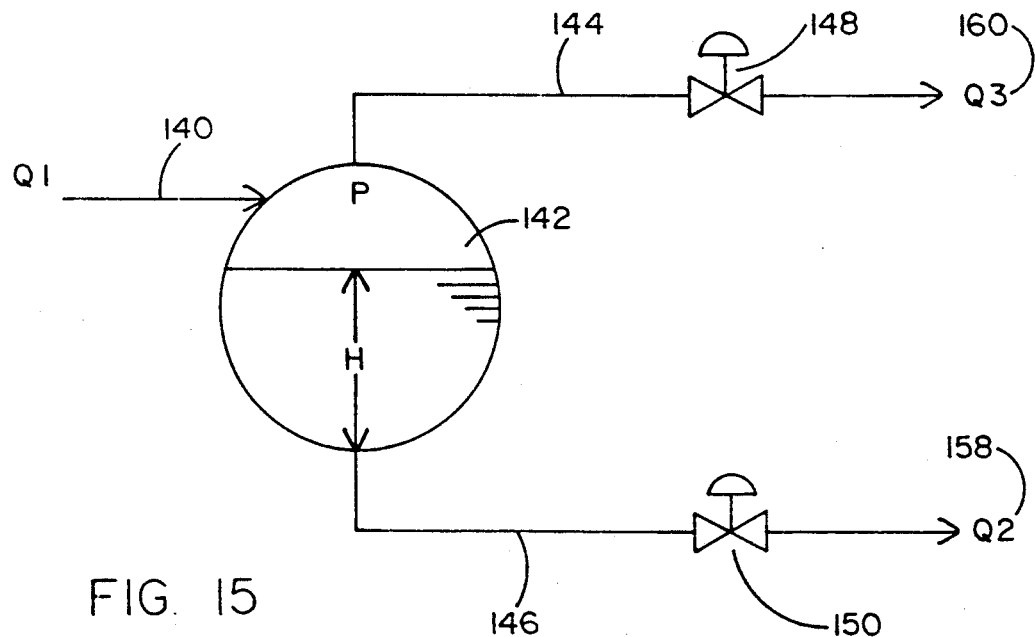
FIG. 15 is a diagram of a typical industrial process in which the invention is useful.

FIG. 15 shows an example of an industrial process for whose control the present invention is particularly adapted. A chemical raw material 140 is introduced at an uncontrolled rate into a pressure vessel 142 in which a reaction takes place to produce a gas 144, and a liquid 146 which fills the vessel 142 to a level H. The pressure P of the gas 144 affects the amount of liquid 146 produced per unit of raw material. The pressure P and level H are controlled by varying the discharge rates of the gas 144 and the liquid 146 by way of valves 148 and 150, respectively.

Figure 16:
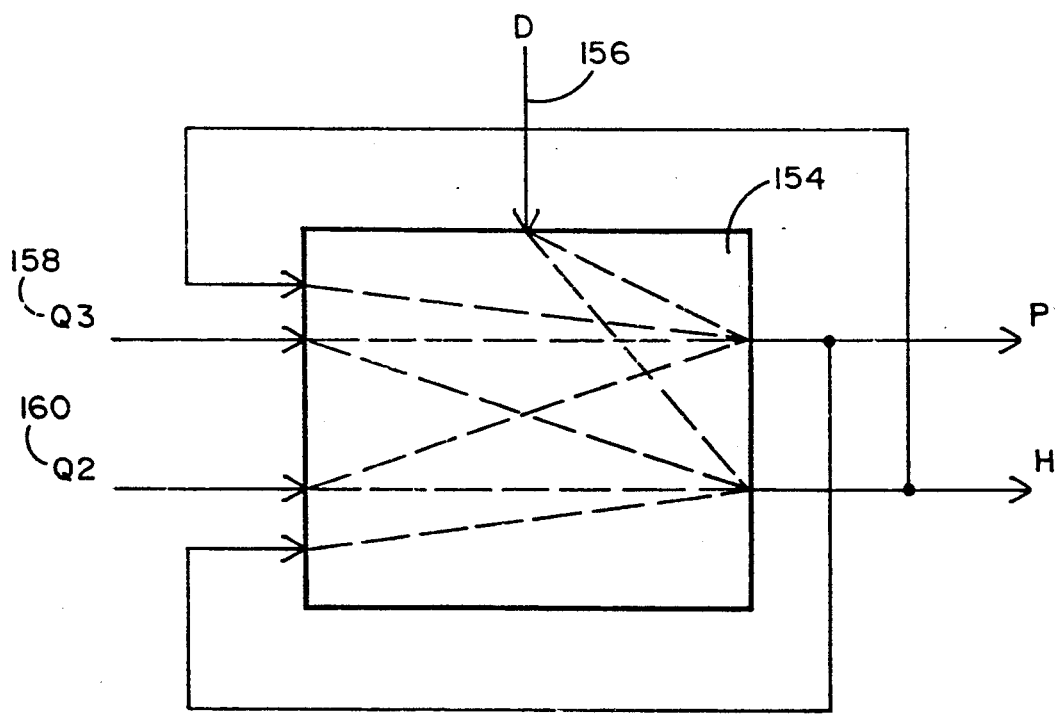
FIG. 16 is a block diagram illustrating the process of FIG. 15.

As shown in FIG. 16, the pressure vessel 142 can be represented as a coupled 2×2 (two-input-two-output) process 154, in which the loop outputs P and H are each affected by each other, by disturbance of 156, and by the discharge settings 158, 160. The process is nonlinear and time-varying (because of the vessel shape), and seriously coupled (because of the interrelationship between P and H).

Figure 17:
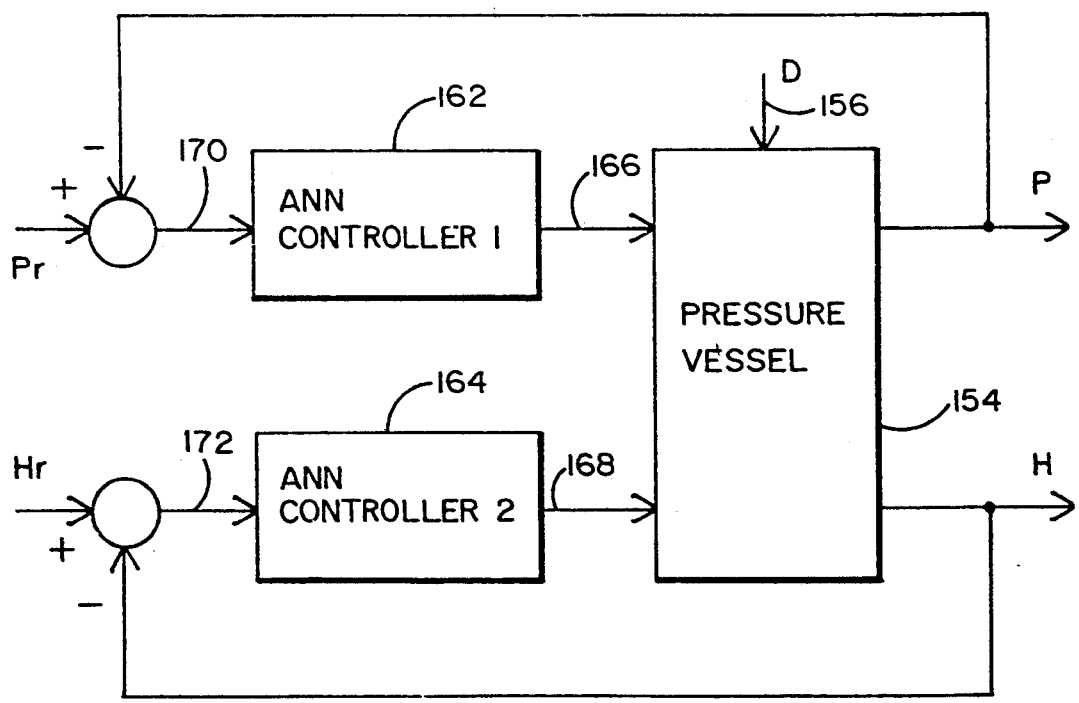
FIG. 17 is a block diagram showing a control system using the ANN controller of this invention.

Due to the behavior of the process, it is very difficult to design two single control loops for P and H with conventional controllers to achieve satisfactory control performance. With the ANN controller of this invention, however, the process 154 can be efficiently controlled by ANN controllers 162, 164 shown in FIG. 17.

The outputs 166, 168 of controllers 162, 164 are the control signals to valves 148, 150, and their inputs 170, 172 are the error signals generated by comparisons of the measured actual values of P and H, respectively, with their desired values $P_r$ and $H_r$. The disturbance input 156 to the pressure vessel system 154 includes both the raw material feed 140 and any other unpredictable disturbances of the system.

With the ANN controllers, good control performance can be achieved. Limited configuration information is required to select the sampling rate and learning rate. Once they are selected properly, no tuning for parameters is required.

We claim:

1. A control system for controlling an open-loop stable process, said process having a process output represented by a process output signal, and being responsive to a control signal for changing said process output as a function of said control signal, said system comprising:
   a) setpoint selection means for generating a setpoint signal representative of a desired value of said process output;
   b) comparator means connected to said setpoint selection means and said process output for comparing said process output signal to said setpoint signal and for deriving from said comparison an error signal representative of the difference between said process output signal and said setpoint signal;
   c) sampling means connected to said comparator means for producing time-spaced samples of said error signal at selected time intervals; and
   d) control means connected to said sampling means and said process, said control means being responsive to said error signal samples for generating said control signal,
   e) said control means being an artificial neural network, said network including a plurality of layers of neurons connected so as to interact with each other in accordance with variable weights, a first of said layers having a plurality of neuron inputs, and another of said layers having a network output; and
   f) said sampling means being so connected to said network as to simultaneously apply to individual ones of said neuron input signals representative of individual ones of said time-spaced error signal samples, and also to simultaneously vary individual ones of said weights as a function of individual ones of said time-spaced error signal samples.

2. The system of claim 1, in which said artificial neural network includes;
   i) an input layer composed of a first plurality of neurons each having an input representative of one of said error signal samples;
   ii) at least one hidden layer composed of a second plurality of neurons, each of said first plurality of neurons having a separate output additively connected to the input of each of said second plurality of neurons; and
   iii) an output layer composed of only one neuron, each of said second plurality of neurons having a separate output additively connected to the input of said output-layer neuron;
   iv) each output of each of said neurons being an individually weighted function of that neuron's input.

3. The system of claim 1, in which said network inputs to include functions of said error signal taken at discrete points in time, and in which one of said discrete points in time is present time, said system further comprising means for adding to the output of said network a function of said present-time error signal.

4. The system of claim 1, in which the inputs and weights of said artificial neural network are functions of said error signal at discrete times, and in which said weights are also a function of a signal representative of the present-time value of said process output.

5. The system of claim 4, in which said functions of said error signal and said process-output-representing signal are the respective normalization factors of said signals.

6. The system of claim 1, in which said process has a dominant time constant, and said time intervals, in seconds, are selected to be substantially equal to one twentieth of said dominant time constant.

7. The system of claim 1, further comprising means for iteratively updating said weights for each successive one of said time intervals, the weights associated with the network paths from said hidden layer to said output layer being first updated according to the formula $$h(1,j)(k) = h(1,j)(k-1) + \eta Y(k)(1 - Y(k))V(j)Es$$

in which $h(1,j)(k)$ is present value of the weight associated with the path from the jth neuron in said hidden layer to said single neuron of said output layer, $h(1,j)(k-1)$ is the last previous value of that weight, $\eta$ is a predetermined constant, $Y(k)$ is the present-time value of the normalized process output, Es is the sum of the normalized error signal samples weighted by a selected scaling factor, and $V(j)$ is the output of the jth neuron in said hidden layer; and said weights associated with the network paths from said input layer to said hidden layer being then updated according to the formula $$w(j,i)(k) = w(j,i)(k-1) + \eta V(j)(1 - V(j)) E(i)$$
$$Y(k)(1 - Yk)) Es\ h(1,j)(k)$$

in which $w(j,i)(k)$ is the present value of the weight associated with the path from the ith neuron of said input layer to the jth layer of said hidden layer, $w(j,i)(k-1)$ is the last previous value of that weight, and $E(i)$ is the normalized error signal input to the ith neuron of said input layer.

8. The system of claim 7, in which the constant $\eta$ is a selectable learning rate.

9. The system of claim 8, in which said learning rate is selected from a range of substantially 1 to substantially 3.

10. The system of claim 9, in which said learning rate is selected to be substantially 2.

11. The system of claim 1, further comprising means for attenuating the output of said network to compensate for high DC gain in said process.

* * * * *